United States Patent
Hirata

(10) Patent No.: US 7,969,989 B2
(45) Date of Patent: Jun. 28, 2011

(54) HIGH PERFORMANCE ETHERNET NETWORKING UTILIZING EXISTING FIBRE CHANNEL ARBITRATED LOOP HBA TECHNOLOGY

(75) Inventor: Kenneth Hiroshi Hirata, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 660 days.

(21) Appl. No.: 11/890,882

(22) Filed: Aug. 7, 2007

(65) Prior Publication Data

US 2009/0041046 A1 Feb. 12, 2009

(51) Int. Cl.
*H04L 12/56* (2006.01)
*H04J 3/22* (2006.01)

(52) U.S. Cl. ................... 370/395.5; 370/466

(58) Field of Classification Search .......... 370/389, 370/395.5, 401, 466, 467, 402, 465
See application file for complete search history.

(56) References Cited

U.S. PATENT DOCUMENTS

| | | | | |
|---|---|---|---|---|
| 6,470,007 | B1 * | 10/2002 | Berman | 370/351 |
| 2006/0251067 | A1 * | 11/2006 | DeSanti et al. | 370/389 |
| 2008/0228897 | A1 * | 9/2008 | Ko | 709/213 |
| 2009/0034522 | A1 * | 2/2009 | Hayes et al. | 370/389 |

* cited by examiner

*Primary Examiner* — Pankaj Kumar
*Assistant Examiner* — Saba Tsegaye
(74) *Attorney, Agent, or Firm* — Morrison & Foerster LLP

(57) ABSTRACT

Embodiments of the present invention are directed to a device which may be used for communication through an Ethernet network. The device may comprise two modules. A first module may be based on an existing Fibre Channel arbitrated loop HBA technology. The second module may be configured to provide a virtual Fibre Channel arbitrated loop network for the first module utilizing the Ethernet network. In other words the second module may process communications generated by the first module as well as incoming communications from the Ethernet network in order to make it appear to the first module that it is communicating with an actual Fibre Channel Arbitrated Loop network (whereas it is actually communicating through an Ethernet network). Thus, existing Fibre Channel technology can be used for the first module and the overall design cost of the device can be reduced.

39 Claims, 8 Drawing Sheets

HIGH PERFORMANCE ETHERNET NETWORKING UTILIZING EXISTING FIBRE CHANNEL ARBITRATED LOOP HBA TECHNOLOGY

FIELD OF THE INVENTION

This invention generally relates to network devices and more specifically to Fibre Channel over Ethernet controllers and support devices.

BACKGROUND OF THE INVENTION

Fibre Channel is a well known standard for network communications. It is generally used for applications where high data transmission rates and high reliability are necessary, such as storage networks. Fibre channel systems are usually based on one of three topologies—point to point, arbitrated loop and switched fabric. For each topology there exist standard initialization and messaging procedures which various devices connected to the network can use to announce their presence to other devices, determine what other devices are present in the network, and determine when a device enters or exits the network. In the point to point and arbitrated loop topologies, these procedures may be performed by the devices themselves. In the switched fabric topology, these procedures may be at least partially performed by the network fabric—i.e., various switches or servers that are considered to be part of the network itself and not devices communicating with the network.

Ethernet is a network communication standard traditionally used for applications for which the data transmission rate and reliability requirements are not as high as they are for Fibre Channel applications. For example, Ethernet is often used as a base layer for TCP/IP networks, which are in turn used for Internet networking. However, recent developments have brought Ethernet technology which may feature data transmission rates and reliability similar to those of Fibre Channel. For example Ethernet enhancements currently being developed at the IEEE standards body allow for Converged Enhanced Ethernet (CEE) which is intended to feature data transmission rates and reliability comparable to those of Fibre Channel.

Since Ethernet is very prevalent, there have been suggestions to move applications that traditionally rely on Fibre Channel (such as, for example, storage networking) to CEE or other types of Ethernet (including standard Ethernet networks). This would save resources as it would remove the necessity of building and supporting two separate networks in an organization (i.e., a Fibre Channel network for storage and an Ethernet network for Internet access, email, etc).

However, changing existing Fibre Channel applications to Ethernet may require that existing networking devices such as, for example, host bus adapters (HBAs) be completely redesigned to use Ethernet. Since existing Fibre Channel HBAs incorporate many years worth of innovation, it may not be cost efficient to completely redesign these devices.

One suggested scheme of switching from Fibre Channel to Ethernet without completely redesigning existing HBAs is to use gateways. More specifically, FCoE gateways can be used to connect a Fibre Channel component to an Ethernet network. An FCoE gateway may be a stand alone device which is connected to the Fibre Channel component through a Fibre Channel link. The gateway may also be connected to an Ethernet network and may thus combine an existing Fibre Channel based HDA with an Ethernet network. However, this approach is not considered optimal as the requirement of using additional standalone devices (i.e., FCoE gateways) would add significant costs to the resulting networks. Furthermore, this would not completely eliminate the necessity for Fibre Channel infrastructure, because a Fibre Channel connection between the gateway and the HBA is still necessary.

Therefore, there is a need for creating a CEE (or other Ethernet) high speed network that utilizes the technology of existing Fibre Channel HBAs to a great extent.

SUMMARY OF THE INVENTION

Embodiments of the present invention are directed to a device which may be used for communication through an Ethernet network. The device may comprise two modules. A first module may be based on an existing Fibre Channel arbitrated loop HBA technology. The second module may be configured to provide a virtual Fibre Channel arbitrated loop network for the first module utilizing the Ethernet network. In other words the second module may process communications generated by the first module as well as incoming communications from the Ethernet network in order to make it appear to the first module that it is communicating with an actual Fibre Channel Arbitrated Loop network (whereas it is actually communicating through an Ethernet network). Thus, existing Fibre Channel technology can be used for the first module and the overall design cost of the device can be reduced.

In some embodiments the second module can simulate a Fibre Channel arbitrated loop initialization process for the first module in order to alert the first module of other devices on the network and to obtain an address for the first module. The second module may initially perform a different Ethernet or IP based initialization or discovery process in order to discover other devices on the network and obtain information for them. The second module can then use the obtained information to simulate a Fibre Channel arbitrated loop initialization process for the first module. This simulation may be performed locally.

In some embodiments, the Ethernet network may be a CEE network. In some embodiments, the Ethernet network may also be an IP network.

DETAILED DESCRIPTION OF EXEMPLARY EMBODIMENTS

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

Although embodiments of the present invention are described herein in terms of HBA adapters for storage area networks, it should be understood that the present invention is not limited to such circuits, but is generally applicable to any devices that connect through Ethernet (or other similar types of networks), while utilizing circuits that have been originally designed for Fibre Channel (or other similar types of networks).

Figure 1:
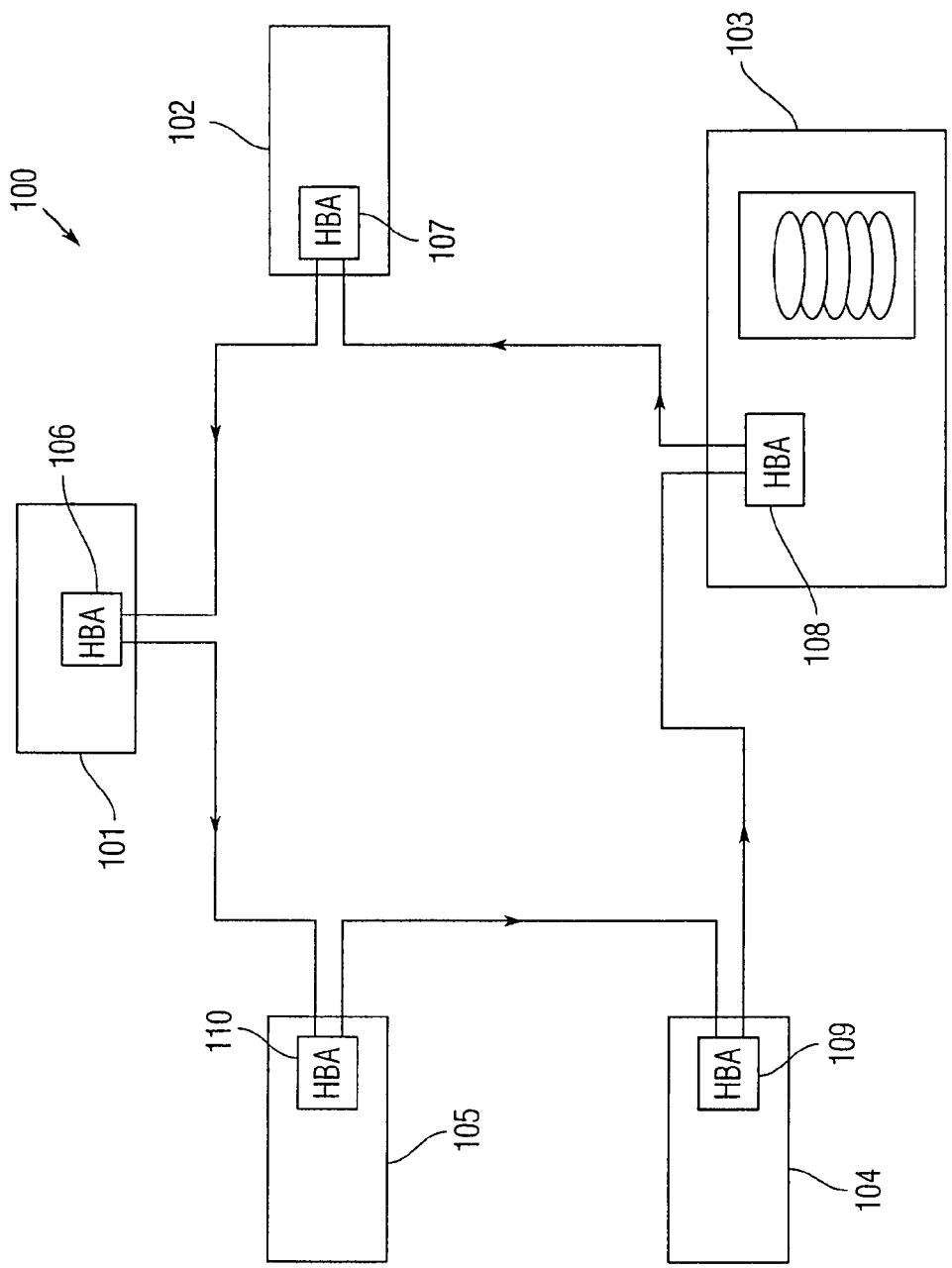
FIG. 1 is a diagram of an exemplary Fibre Channel Arbitrated Loop network.

FIG. 1 is a diagram of an exemplary Fibre Channel network of the arbitrated loop topology 100. Several devices 101, 102, 103, 104 and 105 can be connected to the Fibre Channel network. The exemplary network of FIG. 1 may be a storage area network but other types of Fibre Channel arbitrated loop networks may have similar configurations. Devices 101, 102, 104 and 105 can be computers and device 103 can be a storage device (such as a RAID array) serving the computers. Host Bus Adapters (HBAs) 106-110 can be used by the various devices to connect to the network. HBAs are networking devices which are able to perform some lower level network communications processing without burdening a main processor of the device the host bus adapter is a part of. Therefore, host bus adapters are often used with high throughput networks, such as Fibre Channel networks where the potential burden on the main processor if it had to handle the lower level network communications processing would be great.

The arbitrated loop topology usually provides that communications must flow in a single direction in a loop formed by unidirectional network connections formed between neighboring devices, as shown. Thus, for example, device 105 can only directly send messages to device 104 and directly receive messages from device 101. If device 105 needs to send a message to a device other than 104 (e.g., device 103), it can address the message to the recipient device and send it to device 104. The HBA 109 of device 104 will note that the message is not addressed to its device and forward it on to the next device. The message will thus be forwarded until the target device receives it.

In order to operate together in a fabric network, devices 101-105 must be aware of the other devices in the network and have their respective addresses. In the arbitrated loop topology, there is no dedicated name server that keeps track of the names and addresses of the devices in the network (as is the case for the fabric topology). Instead, in the arbitrated loop topology the various devices acquire addresses from a common address space and inform one another of the assigned addresses without the need for a name server. Therefore, HBAs configured for use with arbitrated loop devices are able to follow a predefined protocol in order to discover and assign addresses to all devices in the circuit (this process is referred to as loop initialization). Furthermore, the HBAs are also configured to repeat the discovery process when a new device is added to the network or when a device drops out of the network. Thus, it can be ensured that the various devices stay current with changes in the network.

Figure 2:
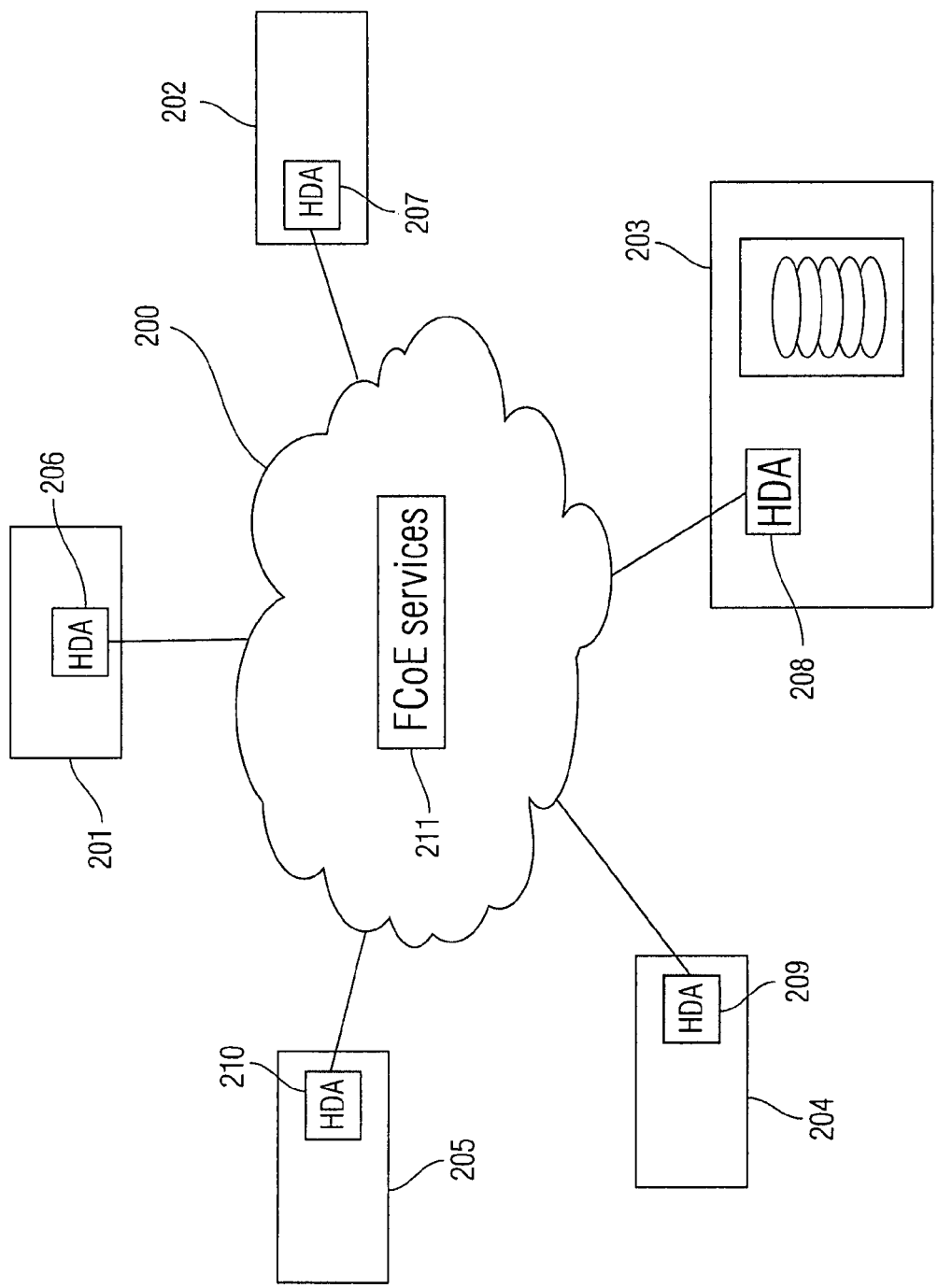
FIG. 2 is a diagram of an exemplary Ethernet network according to embodiments of the invention.

FIG. 2 is a diagram of an Ethernet network. There, devices 201-205 (which may be similar to devices 101-105 of FIG. 1) can be connected to each other through the Ethernet network 200. Ethernet refers to a low level networking infrastructure, and may support other higher level networking protocols, such as, most notably, IP and TCP/IP. Thus, Ethernet network 200 can also serve as an IP and/or TCP/IP network. Furthermore, Ethernet network 200 can be a modern enhanced type of an Ethernet network. For example, Ethernet network 200 can be an Ethernet network enhanced for higher throughput, such as a 10 Gigabit Ethernet network. Furthermore, network 200 can be an Ethernet network enhanced for higher reliability and throughput, such as Converged Enhanced Ethernet (CEE).

As discussed above, it may be desirable to use Ethernet network 200 instead of the Fibre Channel network 100 for the storage area network application. Furthermore, it may be desirable to move other traditionally Fibre Channel based applications to the Ethernet network as well. When more and more applications are moved to a single network, the costs associated with that network will decrease, because of the commonality of components and the ability to share the same network infrastructure among different applications. Thus, for example, Internet access, Storage access, and telephony for an enterprise can all be performed over a single Ethernet network 200.

Devices 201-205 can utilize HDAs 206-210 to connect to Ethernet 200. An HDA can be an advanced Ethernet version of an HBA. In other words, it can perform the same high throughput networking communication processing functions required of an HBA for an Ethernet network (as contrasted from an HBA which is usually intended to operate through a Fibre Channel network). HDAs may be used to connect devices in an Ethernet based storage area network (SAN) or any other application which has been traditionally based on Fibre Channel networking but is being modified for Ethernet. HDAs can also be referred to as ENodes.

Figure 3:
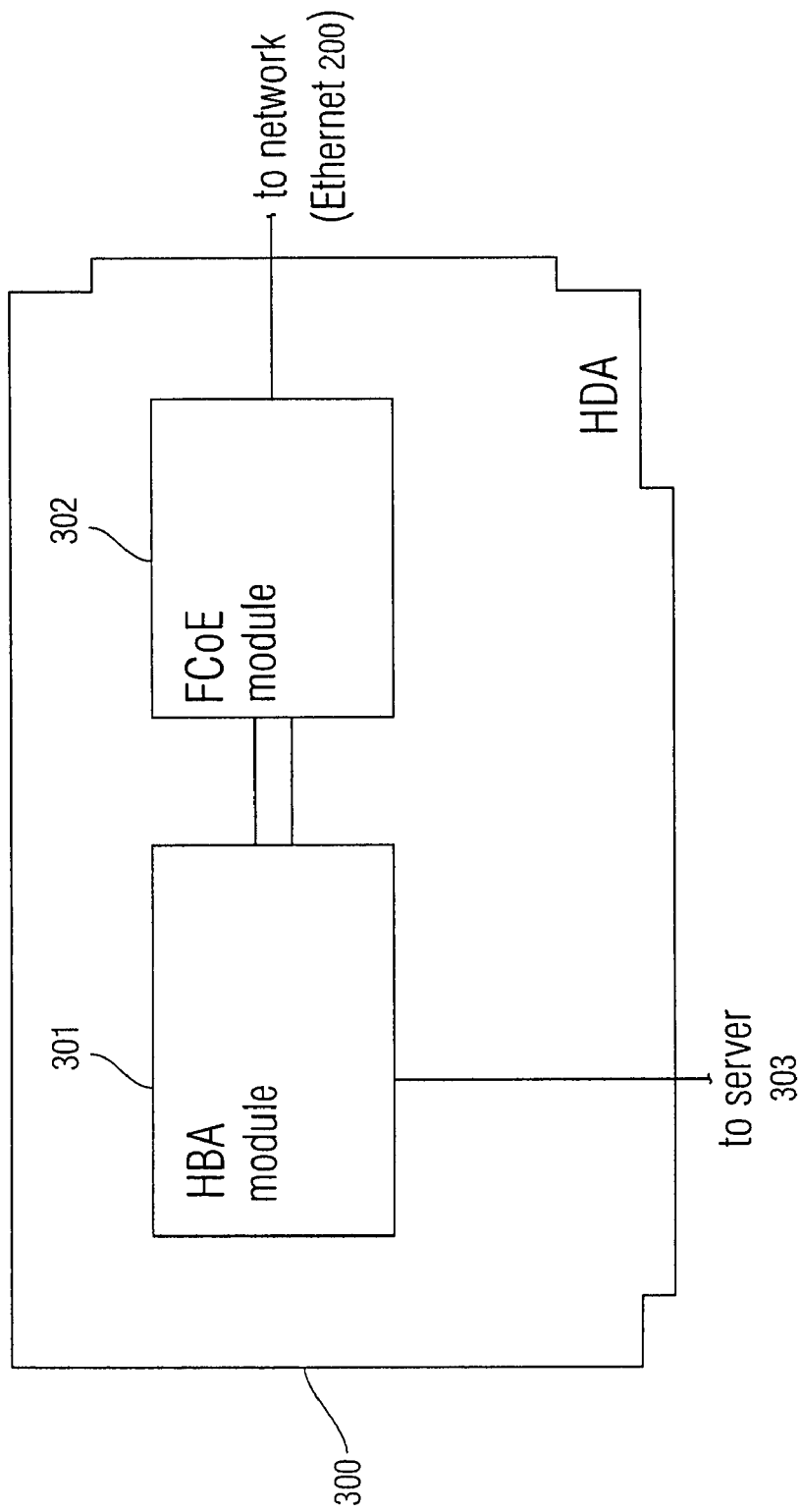
FIG. 3 is a diagram of an exemplary HDA controller according to embodiments of the invention.

FIG. 3 is a diagram of an HDA 300 according to embodiments of the invention. HDA 300 may be one of HDAs 206-210. HDA 300 may include HBA module 301 and FCoE module 302. The HBA module can be the same as a respective module of an existing Fibre Channel HBA (such as, e.g., one of HBAs 106-110 of FIG. 1). Thus, the HBA module may have a similar functionality to that of stand alone HBA, such as any one of HBAs 106-110 of FIG. 1. Specifically, the HBA module may be configured to process incoming and outgoing network communications between a server and a Fibre Channel network. In some embodiments, the HBA module can be a N_Port ID Virtualization (NPIV) HBA module. An NPIV HBA module is a module that allows the device it is a part of to communicate on multiple ports on a Fibre Channel network. Thus, the device can act as multiple devices on the Fibre Channel network.

However, in the present case, there is no Fibre Channel network connected to the HBA module 301. Instead, that module is ultimately connected to an Ethernet network. Therefore, FCoE (Fibre over Ethernet) module 302 can be used to convert the Fibre Channel communications generated from the HBA module to communications suitable for the Ethernet network. Similarly, the FCoE module can convert incoming communications received from the Ethernet network 200 into Fibre Channel specific communication suitable for processing by the HBA module 301.

Consequently the HBA module can operate as if it were actually connected to a Fibre Channel network. Or, in other words, the FCoE module can be used to provide a virtual Fibre Channel network to the HBA module while utilizing the Ethernet based network 200. The goal of this HDA design is to utilize existing Fibre Channel based HBA technology in an Ethernet based HDA. Thus, by ensuring that significant part of the network processing is performed by existing HBA technology, the development costs of an HDA can be reduced.

Figure 4:
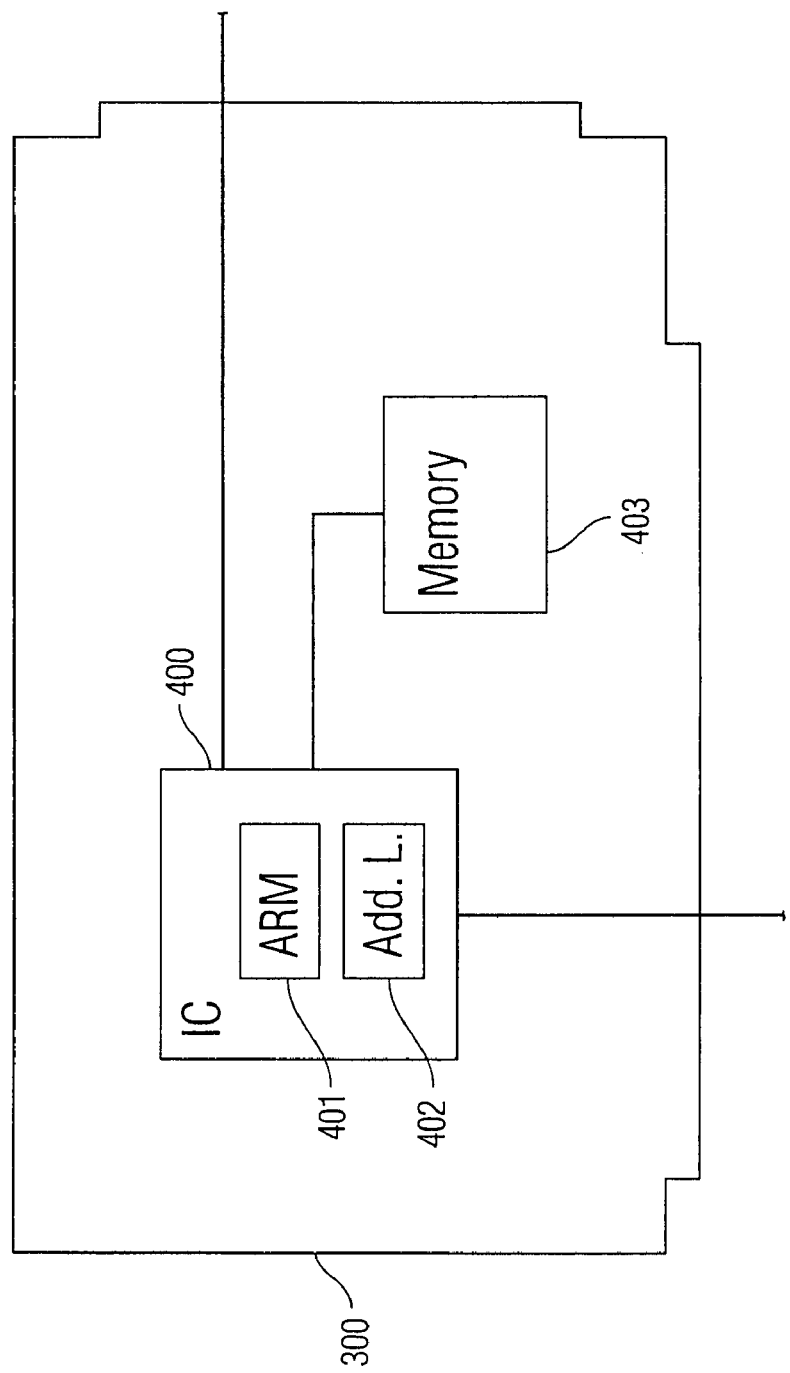
FIG. 4 is another diagram of an exemplary HDA controller according to embodiments of the invention.

The HBA and FCoE modules can be composed of hardware, software or a combination of both. FIG. 4 is a diagram of an exemplary embodiment of HDA 300. The HDA 300 may include an integrated circuit (IC) 400 which includes an ARM processor 402 and additional logic 402. The HDA may also include memory 403 which includes instructions executable at the ARM processor. Some of the additional logic and some of the instructions executable at the ARM processor may be part of the HBA module while other portions of the additional logic and other instructions executable at the ARM processor may be part of the FCoE module. In general, the HBA and FCoE modules are not required to be discrete hardware or software components (i.e., discrete integrated circuits or software programs). Instead, a single hardware component can provide the functionality or parts thereof of both the HBA and FCoE modules.

In order to correctly virtualize the Fibre Channel network, the FCoE module may need to:

(1) Wrap outgoing Fibre Channel packets into Ethernet frames and unwrap in coming Ethernet frames to form Fibre Channel packets.

(2) Simulate the address assignment and discovery behavior of an arbitrated loop Fibre Channel network of the fabric topology.

(3) Route the wrapped Fibre Channel communications to their correct destination on the Ethernet network.

A person of skill in the art would recognize that executing part 1 above may be done by "wrapping" Fibre Channel packages into Ethernet frames or, in other words, tunneling Fibre Channel over Ethernet.

Regarding part 2, according to some embodiments, the FCoE module can simulate the discovery process of a Fibre Channel arbitrated loop network (i.e., perform part 2 above) by forwarding communications between the devices in the path of a Fibre Channel arbitrated loop and allowing the HBA modules of each device to perform the usual loop initialization process. Thus, the various FCoE modules of HDAs 206-210 can forward communications to and from their respective HBA modules so that their HBA modules are effectively connected in the manner shown in FIG. 5. Thus, the HBA modules can use the ordinary arbitrated loop initialization procedures to perform discovery.

However, there may be some disadvantages to the above scheme. First, in order to realize the connection of FIG. 5, the HDA modules must themselves be aware of the addresses of the other devices on the network. This is not an issue in an actual Fibre Channel network, because there (as seen in FIG. 1) the output of each device is connected to only one device. Therefore, no addressing is needed to communicate with the next device in the loop. Naturally, this is not the case for a switched network, such as Ethernet network 200. Furthermore, replicating loop initialization in such manner would make the overall process relatively slow. In fact the process may be much slower than it would be in a true arbitrated loop Fibre Channel network, because for the latter network neighboring devices are directly connected, while in an Ethernet network neighboring devices may be connected through various network elements, such as hubs, switches, etc. This slowing of the initialization process may result in noticeable decrease of performance in the network. It may even render the initialization process inoperable as certain time out periods defined in arbitrated loop initialization protocols may be exceeded.

Therefore, other embodiments perform part 2 above in a different way. More specifically, some embodiments of the present invention utilize a server placed in Ethernet network 200 in order to emulate the arbitrated loop initialization process. This server can be Fibre Channel over Ethernet (FCoE) services server 211.

An FCoE services server (FCoE services) can perform functions similar to that of a name server of a Fibre Channel fabric network or an iSNS server in an IP based storage network. In other words, the FCoE services can allow various devices in the network to register with it and keep information of the devices connected to the network. The information may include the addresses of these devices. The FCoE services may allow devices to request information for the other devices in the network and provide that information to them. The FCoE services may also send out updates to various devices when the network changes (such as, for example, when a device enters or drops out of the network). These updates may be notifications similar to the registered state change notifications (RSCNs) provided by name servers in Fibre Channel fabric networks and the state change notifications (SCNs) provided by iSNS servers.

An FCoE services server may communicate based on the Ethernet and Access Resolution (ARP) protocols. Thus, it need not implement any higher level protocols, such as the Internet Protocol (IP). Similarly, the entire network 200 may operate without utilizing the IP protocol or any other higher level protocols. This may simplify and speed up communications over the network. However, if the network is used for multiple functions (such as, e.g., storage, Internet access, etc.) some functions (such as, e.g., Internet access) may utilize the IP protocol while others such as Fibre Channel over Ethernet storage networking, may operate at Ethernet and ARP protocols.

Figure 6:
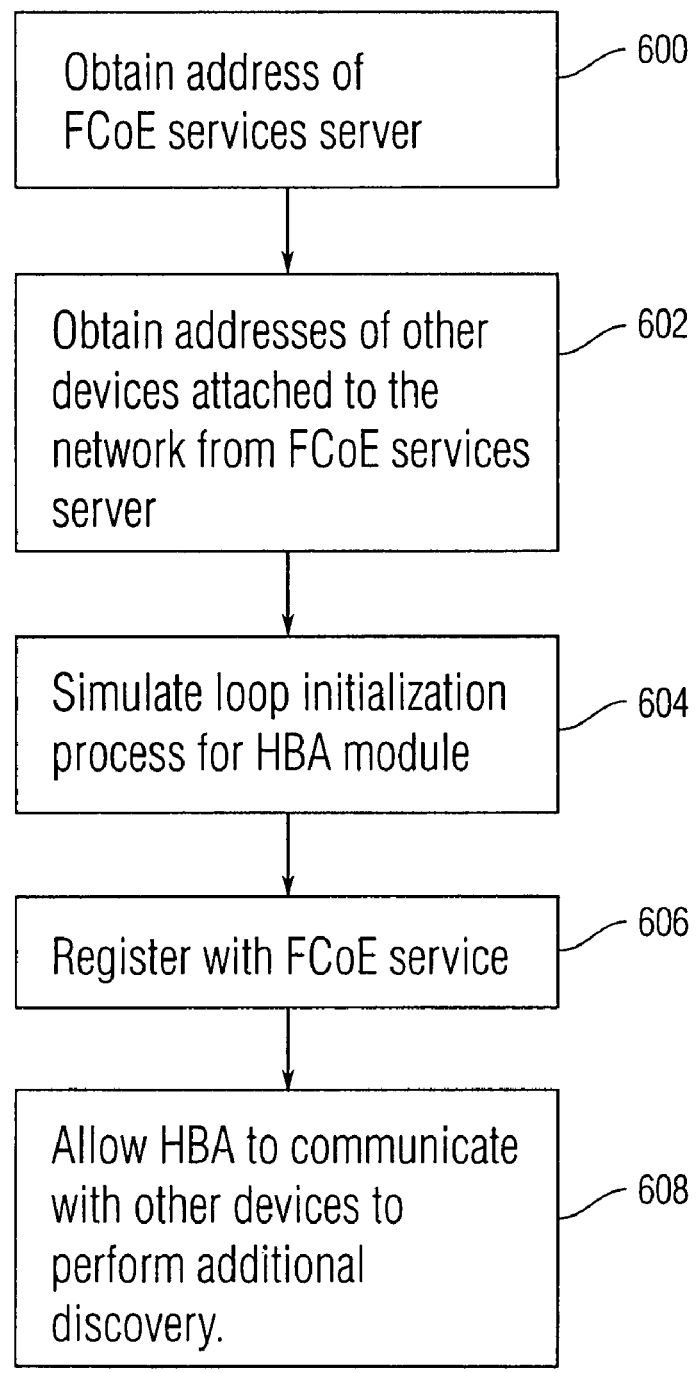
FIG. 6 is a flow chart of an exemplary method for simulating the loop initialization process according to embodiments of the present invention.

FIG. 6 shows a method which may be used by the FCoE module (with the assistance of the FCoE services) to emulate the native arbitrated loop address assignment and discovery process for the HBA module. In step 600 the FCoE module obtains the address of the FCoE services server. This may be done by sending an ARP request, to obtain the FCoE services' Ethernet media access control (MAC) address.

Once the address of the FCoE services is obtained, the FCoE module can access the FCoE services to request and obtain the addresses of all other devices in the network (step 602). These addresses can include addresses that would usually be provided during the loop initialization process, such as the Fibre Channel addresses of all devices connected to the network. The addresses may also include the Ethernet network addresses of these devices (i.e., their Ethernet MAC addresses), even though these addresses would not be usually provided in a Fibre Channel arbitrated loop initialization procedure. The FCoE module may store the Fibre Channel and Ethernet addresses of the other devices in the network in a table.

In step 604, the FCoE module may simulate the loop initialization process for the HBA module. Since the FCoE module possess the Fibre Channel addresses of the other devices on the network already (obtained in step 604), the FCoE module can simulate the loop initialization process locally. Thus, the FCoE module can communicate with the HBA module in accordance with known loop initialization protocols and make it appear to the HBA module that it is communicating with an entire arbitrated loop network undergoing a loop initialization process. Thus, the HBA module may obtain the Fibre Channel specific addresses of the other devices from the FCoE module. During step 604, the HBA and FCoE modules may also determine a Fibre Channel address for the current device (i.e., the device the HBA and FCoE modules are a part of). This address may be claimed by the HBA module as part of the ordinary loop initialization process. At step 606, the FCoE module may register the newly generated local Fibre Channel address of the current device as well as the Ethernet MAC address of the current device with the FCoE service 211. Thus, if another device performs the initialization process discussed above, it would be able to obtain the Fibre Channel and Ethernet MAC addresses of the current device from the FCoE service.

Figure 5:
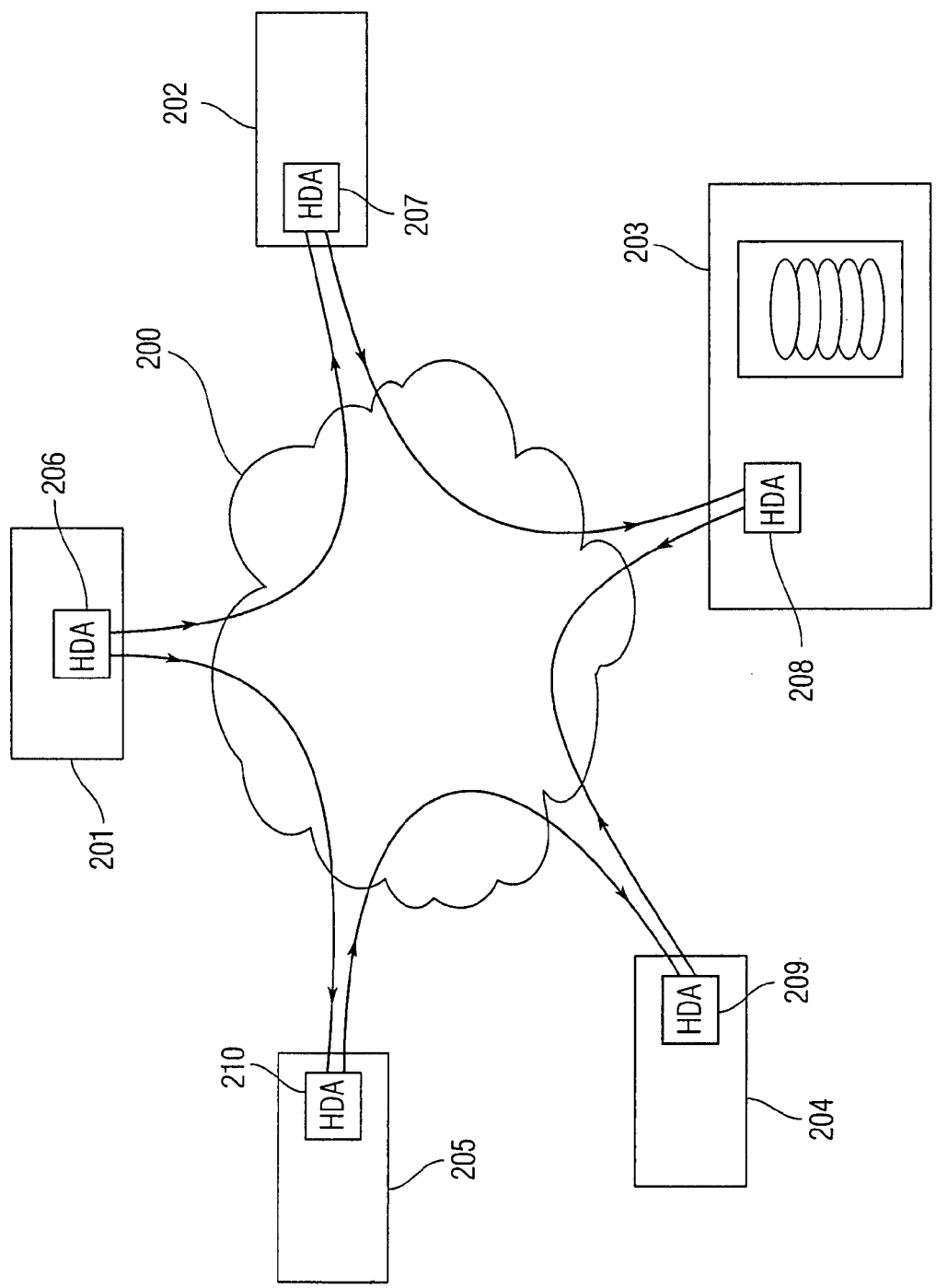
FIG. 5 is a diagram of an exemplary Ethernet network showing an exemplary scheme for simulating the loop initialization process according to embodiments of the invention.

It should be noted that the process discussed in connection with FIG. 6 differs from the process discussed in connection with FIG. 5, as it provides for local simulation of the loop initialization process. Thus, the process of FIG. 6 may be considered an improvement over the one of FIG. 5 because simulating the loop initialization process locally can be performed faster.

In step 608, the FCoE module can allow the HBA module to communicate with other devices on the network in order to perform additional discovery. Thus, in step 608, the HBA module can discover additional information from the other devices in the network by directly communicating with them. While the HBA module will attempt to communicate with the other devices in the Fibre Channel format using Fibre Channel addresses, at this point the FCoE module can route communications between the HBA module and other devices on the network by looking up the Ethernet MAC addresses of the other devices in the table created in step 602 based on the Fibre Channel addresses provided by the HBA module.

Similarly, the table of addresses created in step 602 can also be used by the FCoE module to route communications from the HBA module to other devices in the network during ordinary communication (i.e., after the initialization and discovery process has completed). Thus, part 3 above can be performed by the FCoE module by referring to the Ethernet addresses of the various devices of the network obtained during part 2. Furthermore, the FCoE module may forward ordinary communications of the HBA module directly to their destinations and not through various intermediary devices as is often the case in Fibre Channel arbitrated loop networks. For example, referring to FIG. 2, if the HBA module of device 204 attempts to communicate with that of device 202, the FCoE module can send the communications directly to device 202 and instead of sending them to device 203 and relying on that device to forward them on to device 202 (as would be the case in an ordinary Fibre Channel arbitrated loop network).

Figure 7:
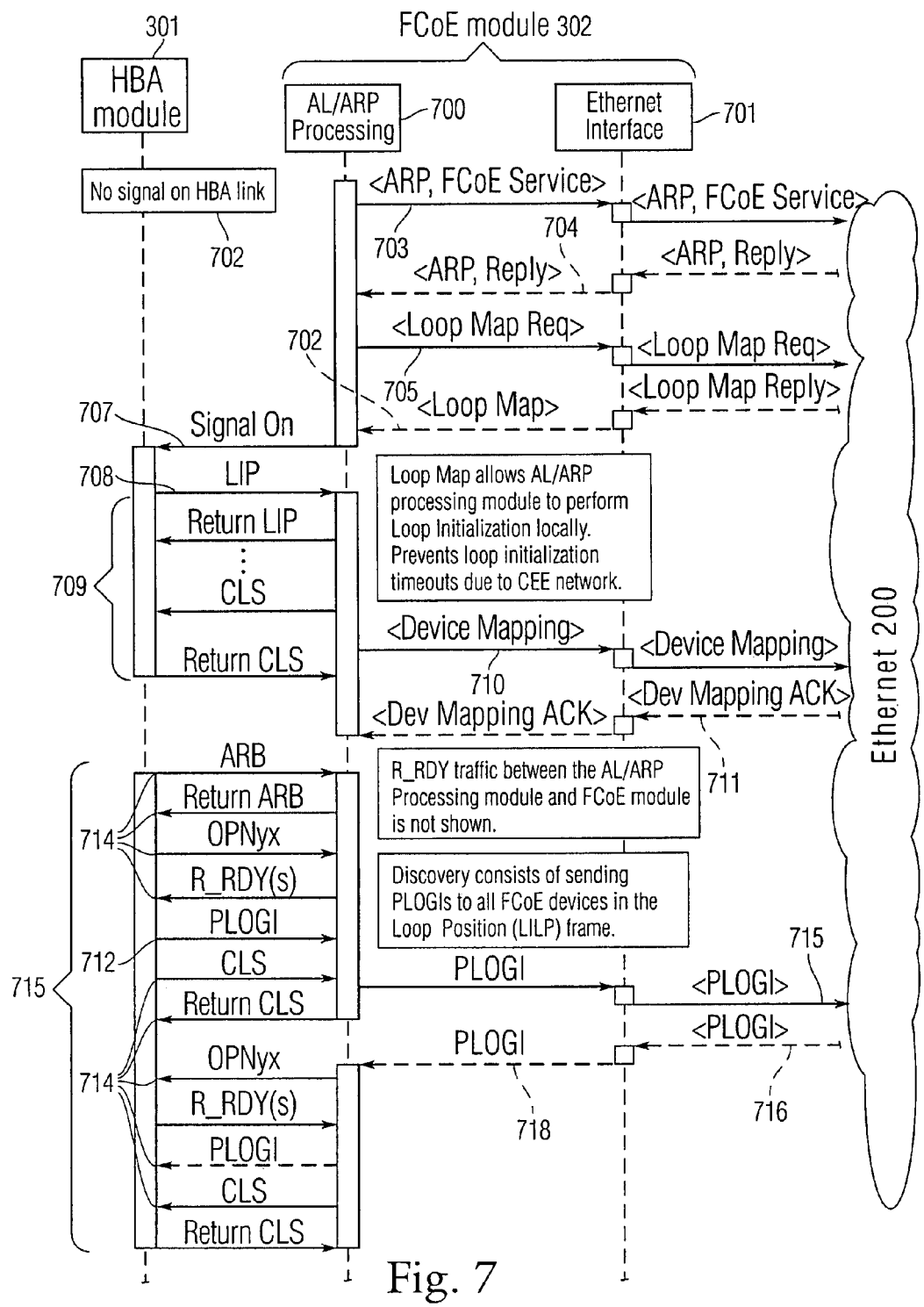
FIG. 7 is a diagram showing the operation of an exemplary HDA during initialization according to embodiments of the invention.

FIG. 7 shows the process discussed in FIG. 6 in more detail. More specifically, FIG. 7 shows a time diagram of an HDA during the process of initialization and discovery. FIG. 7 shows the two modules of the HDA—the HBA module 301 and the FCoE module 302. The FCoE module may include 2 elements: an arbitrated loop/address resolution protocol processing element (AL/ARP processing element or processing element) and an Ethernet interface 701.

The Ethernet interface 701 is connected to Ethernet network 200 and is used to format communications in the Ethernet protocol and remove Ethernet formatting from incoming communications. Thus, the Ethernet interface performs tunneling of Fibre Channel communications over Ethernet. Commands in angle brackets (such as, for example "<PLOGI>") signify commands formatted for the Ethernet network 200, while commands without brackets (such as, for example, PLOGI) signify commands formatted for a Fibre Channel network. Also communications received from remote devices and servers (such as the FCoE services server) are signified by broken line arrows, while outgoing and local communications are signified by solid line arrows.

The processing element 700 communicates with the HBA module 301 and may be used to simulate an arbitrated loop Fibre Channel network for the HBA module. Accordingly, the processing element may simulate the behavior of an arbitrated loop Fibre Channel network during loop initialization and discovery as well as during ordinary communications.

In the first stages of the initialization procedure, no signal is sent to the HBA module (see 702). Thus, the HBA module is led to believe that it is not at all connected to a Fibre Channel network. The processing element sends an ARP request 703 to determine the address of the FCOE service 211 (in alternative embodiments, DHCP requests to a DHCP server can be used). The request may be a broadcast request so that all devices on the network will detect it. The Ethernet interface may format the request for Ethernet transmission and send it to network 200. The FCoE service 211 (which is connected to Ethernet network 200 but is not shown in FIG. 7) responds with ARP reply 704 indicating its Ethernet MAC address. Thus the processing element completes step 600 of FIG. 6.

The processing element then sends a loop map request 705 to the FCoE service. The loop map is a map (or an array) of the Fibre Channel addresses of all devices connected to the network as well as their respective Ethernet addresses. The FCoE service responds by sending the loop map in communication 706. The processing element can then save the data of the loop map in a local table. Thus, step 602 of FIG. 6 is completed.

Once it has obtained the loop map, the processing element can simulate the loop initialization process for HBA module 301. Thus the processing element sends a signal 707 to the HBA module to simulate that the HBA module has been connected to a Fibre Channel arbitrated loop network. At this point the HBA module, believing that it has just been connected to an arbitrated loop network, starts loop initialization in order to join the network. Accordingly, the HBA module sends out a loop initialization primitive (LIP) 708.

During period 709, the HBA module performs loop initialization with what it believes are the other devices of an arbitrated loop network. However, in reality, only the processing element 700 communicates with the HBA module. The processing element uses the Fibre Channel address information contained in the loop map to simulate the behavior of the other devices in a Fibre Channel arbitrated loop network according to known loop initialization protocols. This simulation is performed locally by the processing element based on the information in the loop map. Thus, simulated loop initialization may be performed relatively quickly and without interrupting the other devices in the network. Thus step 604 of FIG. 6 may be completed.

During the loop initialization simulation (period 709) an address for the current device (i.e., the device the HBA and FCoE modules are a part of) is assigned. The processing element registers that address with the FCoE services. This may be done by modifying the loop map received in communication 706 to include the recently assigned address of the current device. The thus modified loop map may then be sent back to the FCoE services in a device mapping communication 710. The FCoE services may then acknowledge the registration with acknowledgement communication 711. Thus, step 606 of FIG. 6 is complete.

At this point the loop initialization process is over and the simulated Fibre Channel network is in normal (i.e., ordinary communication mode). According to existing arbitrated loop protocols, in order to complete discovery of all other devices in the network, the HBA module may login in all these devices. For that reason, the processing element simulates the behavior of the Fibre Channel network during ordinary communications.

In order to login into another device, the HBA module may need to send a PLOGI command, such as command 712. However, in an arbitrated loop a device cannot usually simply send a command. Instead each device that wishes to initiate transmission has to engage in a complex arbitration and flow control process in order to obtain use of the loop for the purposes of sending a transmission. This process is defined by existing Fibre Channel arbitrated loop protocols and will not be discussed here in detail. In general, the process requires the sending and receipt of various primitives which determine which device can use the loop to send data and for how long it can use it. Such primitives are not necessary for Ethernet communications. Therefore, the processing element simulates the arbitration and flow control process locally by sending and receiving various primitives 714 to and from the HBA module. As this process is simulated locally, primitives 714 need not be sent over the Ethernet network 200.

Only the PLOGI command is sent out the Ethernet network 200. Since the HBA module 301 is not aware of the existence of an Ethernet network and it believes it is communicating through Fibre Channel, it addresses the PLOGI command to the Fibre Channel address of the device it is attempting to communicate with. The Ethernet interface receives the PLOGI command and obtains the Ethernet MAC address of the destination device by looking up the stored loop map based on the Fibre Channel address The PLOGI command was initially addressed to. Then, the Ethernet interface wraps the PLOGI command in Ethernet frame(s), addresses it to the obtained Ethernet MAC address and sends it out as an Ethernet formatted communication 715.

In response, a remote device can send back a PLOGI response 716. This command is received by the Ethernet interface 701. The Ethernet interface removes the Ethernet specific formatting and addressing from the command to obtain a Fibre Channel formatted PLOGI response 718. The processing element sends the incoming PLOGI command to the HBA module by performing the flow control process which would usually accompany the receipt of such a communication in an arbitrated loop network. Again, the flow control process is performed locally by the processing element by sending and receiving various primitives 714 according to known arbitrated loop protocols.

The process shown in stage 715 can be utilized for any data transmissions between different devices in the network. In general, when a device needs to send or receive data its processing element simulates the arbitration and flow control communications that would ordinarily be necessary to send or receive data over an arbitrated loop locally. Thus, only the actual data (such as, e.g., the PLOGI messages) needs to be sent or is received over the Ethernet network.

Figure 8:
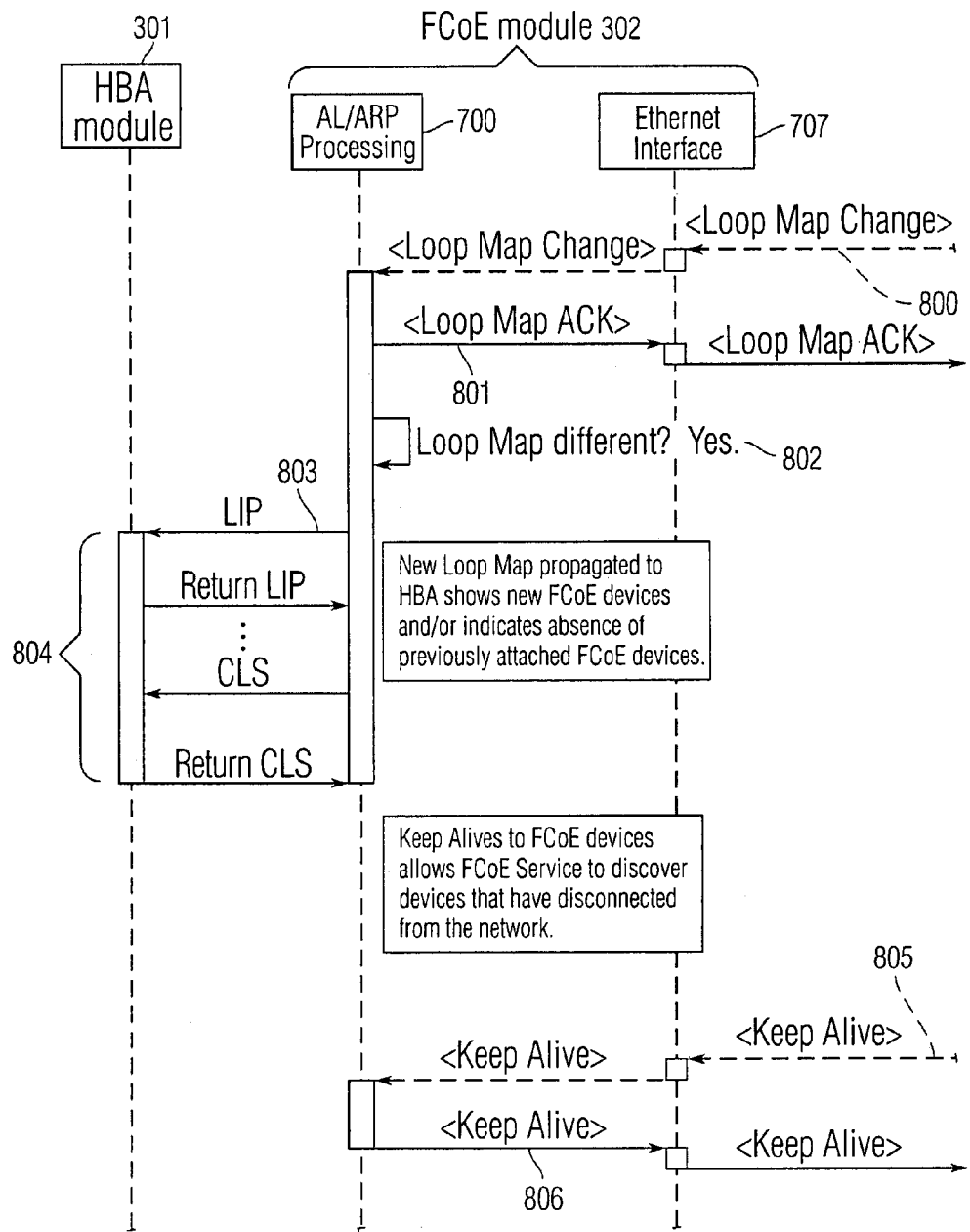
FIG. 8 is a diagram showing the operation of an exemplary HDA when a new device joins the network and/or when a device leaves the network according to embodiments of the invention.

While the discussion above showed the behavior of the HDA when the current device joins a network, FIG. 8 shows the behavior of the HDA when the current device is already part of a network but another new device joins the network (or when a device leaves the network). Networks which rely on centralized Fabric Services (such as, for example, Fibre Channel Fabric networks) provide for a state notification service which can be used by the Fabric Controller to alert all devices in a network that another device is joining or leaving the network.

However, no centralized server is present in a Fibre Channel arbitrated loop network. Therefore, state change notification services are not used for Fibre Channel arbitrated loop networks. Instead, when a new device is attached to the network, it sends the LIP primitive and triggers loop initialization. Thus, the entire network undergoes loop initialization every time a new device joins.

The Ethernet network featured by embodiments of the present invention does use a centralized server (the FCoE services server). However, the present invention simulates a network that does not use such a server (i.e., an arbitrated loop network). Therefore, embodiments of the present invention use a combination of the state change notification and loop initialization schemes when a new device joins the network.

FIG. 8 shows in more detail the behavior of an HDA when a new device (other than the current device) joins the network. When a new device joins the network the new device alerts the FCoE services (see step 606 of FIG. 6, message 710 of FIG. 7). The FCoE services may then send an alert to all devices that are currently part of the network. This may be accomplished by sending a <Loop Map Change> message 800 to these devices. Message 800 may be received by the AL/ARP processing element 700. The processing element may then send back to the FCoE services an acknowledgement 801 that it received the message.

The <Loop Map Change> message may include a copy of the entire loop map. In step 802, the processing element may check the received loop map with a locally stored copy of the loop map to determine if the loop map is different. In this case, it is assumed that a device has joined or left the network so the loop map is in fact different.

Upon determination that a new loop map is different, the processing element sends a LIP to the HBA module in order to initiate a simulated loop initialization process. During period 804, the processing element simulates the loop initialization process for the HBA module. The processing element bases the simulation on the addresses of devices from the new loop map received in message 800. Thus, during period 804, the HBA module becomes aware of the new network make up which may include any newly added devices and exclude any devices that may have left the network. Consequently, the HBA module becomes aware of any changes in the make up of the network. The simulation may be performed by the processing element locally without messaging any remote devices.

Thus, when a new device joins the network and consequently performs the process discussed above in connection with FIG. 7, all other devices currently in the network will be alerted by the FCoE services of the modified loop map and will perform the process described above in connection with FIG. 8. Thus, it may be the case that after a new device joins a network, all or most HBA modules in the network are performing an initialization procedure. But the devices would not be performing a single initialization procedure together (by communicating with each other). Instead, all HBA modules would perform a separate local simulated initialization procedure by communicating with their respective FCoE modules. This may be advantageous, because performing multiple different local initialization procedures concurrently may be significantly faster as it avoids delays caused by inter-device network communications.

In embodiments of the present invention, the FCoE services server can detect when devices drop out of the network and notify the remaining devices in such an event. The notification can be performed by sending a loop map change message, such as message 800 to the devices remaining in a network. The FCoE services may detect when devices drop out by periodically sending a <Keep Alive> message 805 to devices in the network. Message 805 can be processed by the processing element by returning a <Keep Alive> message 806 back to the FCoE server. Thus, the FCoE server may determine that the current device is still connected to the network. If it does not receive response 806 within a predefined period of time, the FCoE server will determine that the current device has dropped out of the network and send an updated loop map to the other devices in the network.

It is noted that the present invention is not limited to the specific exemplary embodiments discussed above. For example, the FCoE module is not limited to the elements discussed in FIGS. 7 and 8, or to the methods discussed in these figures. Furthermore, while featuring an FCoE services server that is only based on the Ethernet and ARP protocols does present certain advantages, this is not required for all embodiments of the invention. In some embodiments, the FCoE services server may be based on the IP protocol or even the TCP protocol. In some embodiments, an IP based iSNS server may be configured to serve as the FCoE services server.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A method for operating a networking device including a host bust adapter (HBA) module configured to communicate according to a Fibre Channel arbitrated loop protocol and a Fibre Channel over Ethernet (FCoE) module connected to the HBA module, the method comprising:
   connecting the FCoE module to an Ethernet network;
   receiving by the FCoE module from a server connected to the Ethernet network information about one or more devices connected to the Ethernet network; and
   utilizing the received information to simulate a Fibre Channel arbitrated loop initialization process for the HBA module by the FCoE module without sending or receiving any arbitrated loop primitives over the Ethernet network.

2. The method of claim 1, further comprising locally simulating the arbitration and flow control behavior of a Fibre Channel arbitrated loop network during non-initialization network communications for the HBA module by the FCoE module.

3. The method of claim 2, wherein locally simulating the arbitration and flow control behavior of a Fibre Channel arbitrated loop network during non-initialization network communications further comprises:
   sending by the HBA module to the FCoE module one or more arbitrated loop primitives as well as a message to another device on the Ethernet network; and
   sending the message to the other device by the FCoE module without sending the primitives over the Ethernet network.

4. The method of claim 3, wherein the receiving of the information of the one or more devices further comprises receiving a Fibre Channel and an Ethernet address for each of the one or more devices and storing the received addresses at the networking device, wherein the method further comprises:
   extracting a Fibre Channel address from the message sent by the HBA module to the FCoE module, the Fibre Channel address being associated with the other device; and
   obtaining an Ethernet address associated with the extracted Fibre Channel address from the stored received addresses,
   wherein sending the message to the other device by the FCoE module further comprises addressing the message to the obtained Ethernet address and sending the message.

5. The method of claim 2, wherein locally simulating the arbitration and flow control behavior of a Fibre Channel arbitrated loop network during network communications further comprises:
   receiving a message over the Ethernet network from another device by the FCoE module;
   reformatting the message to a format associated with a Fibre Channel loop network;
   sending one or more arbitrated loop primitives by the FCoE module to the HBA module; and
   sending the reformatted message by the FCoE module to the HBA module.

6. The method of claim 1, wherein simulating the Fibre Channel arbitrated loop initialization process by the FCoE module further includes alerting the HBA module of the one or more devices for which information was received.

7. The method of claim 1, wherein the simulating of the Fibre Channel arbitrated loop initialization process for the HBA module by the FCoE module results in assigning of a Fibre Channel address for the networking device, and the method further includes sending the assigned Fibre Channel address to the server.

8. The method of claim 1, wherein the FCoE module and the server communicate over the Ethernet network using the Ethernet protocol and the address resolution protocol (ARP) but do not communicate using the Internet Protocol (IP).

9. The method of claim 1, wherein the networking device is an HDA.

10. The method of claim 1, wherein the Ethernet network is a converged enhanced Ethernet (CEE) network.

11. A method for operating a networking device including an HBA module configured to communicate according to a Fibre Channel arbitrated loop protocol and an FCoE module connected to the HBA module, the method comprising:
    connecting the FCoE module to an Ethernet network comprising one or more other devices; and
    providing for the HBA module a virtual Fibre Channel network comprising the one or more other devices by the FCoE module without sending any Fibre Channel arbitrated loop primitives over the Ethernet network.

12. The method of claim 11, wherein providing of a virtual Fibre Channel network further includes obtaining by the FCoE module from a server connected to the Ethernet network addresses of the one or more other devices.

13. A non-transitory computer readable medium comprising instructions for execution at a networking device including an HBA module configured to communicate according to a Fibre Channel arbitrated loop protocol and an FCoE module connected to the HBA module, the instruction being configured to cause the networking device to execute a method comprising:
    connecting the FCoE module to an Ethernet network;
    receiving by the FCoE module from a server connected to the Ethernet network information about one or more devices connected to the Ethernet network; and
    utilizing the received information to simulate a Fibre Channel arbitrated loop initialization process for the HBA module by the FCoE module without sending or receiving any arbitrated loop primitives over the Ethernet network.

14. The computer readable medium of claim 13, wherein the method further comprises locally simulating the arbitration and flow control behavior of a Fibre Channel arbitrated loop network during non-initialization network communications for the HBA module by the FCoE module.

15. The computer readable medium of claim 14, wherein locally simulating the arbitration and flow control behavior of a Fibre Channel arbitrated loop network during non-initialization network communications further comprises:
sending by the HBA module to the FCoE module one or more arbitrated loop primitives as well as a message to another device on the Ethernet network; and
sending the message to the other device by the FCoE module without sending the primitives over the Ethernet network.

16. The computer readable medium of claim 15, wherein the receiving of the information of the one or more devices further comprises receiving a Fibre Channel and an Ethernet address for each of the one or more devices and storing the received addresses at the networking device, wherein the method further comprises:
extracting a Fibre Channel address from the message sent by the HBA module to the FCoE module, the Fibre Channel address being associated with the other device; and
obtaining an Ethernet address associated with the extracted Fibre Channel address from the stored received addresses,
wherein sending the message to the other device by the FCoE module further comprises addressing the message to the obtained Ethernet address and sending the message.

17. The computer readable medium of claim 14, wherein locally simulating the arbitration and flow control behavior of a Fibre Channel arbitrated loop network during network communications further comprises:
receiving a message over the Ethernet network from another device by the FCoE module;
reformatting the message to a format associated with a Fibre Channel loop network;
sending one or more arbitrated loop primitives by the FCoE module to the HBA module; and
sending the reformatted message by the FCoE module to the HBA module.

18. The computer readable medium of claim 13, wherein simulating the Fibre Channel arbitrated loop initialization process by the FCoE module further includes alerting the HBA module of the one or more devices for which information was received.

19. The computer readable medium of claim 13, wherein the simulating of the Fibre Channel arbitrated loop initialization process for the HBA module by the FCoE module results in assigning of a Fibre Channel address for the networking device, and the method further includes sending the assigned Fibre Channel address to the server.

20. The computer readable medium of claim 13, wherein the FCoE module and the server communicate over the Ethernet network using the Ethernet protocol and the address resolution protocol (ARP) but do not communicate using the Internet Protocol (IP).

21. The computer readable medium of claim 13, wherein the networking device is an HDA.

22. The computer readable medium of claim 13, wherein the instructions are executed at an embedded ARM processor comprised by the networking device.

23. The computer readable medium of claim 13, wherein the Ethernet network is a CEE network.

24. A non-transitory computer readable medium comprising instructions for execution at a networking device including an HBA module configured to communicate according to a Fibre Channel arbitrated loop protocol and an FCoE module connected to the HBA module, the instruction being configured to cause the networking device to execute a method comprising:
connecting the FCoE module to an Ethernet network comprising one or more other devices; and
providing for the HBA module a virtual Fibre Channel network comprising the one or more other devices by the FCoE module without sending any Fibre Channel arbitrated loop primitives over the Ethernet network.

25. A networking device comprising:
an HBA module configured to communicate over a Fibre Channel Arbitrated loop network; and
an FCoE module connected to the HBA module and to an Ethernet network, the FCoE module being configured to:
receive from a server connected to the Ethernet network information about one or more devices connected to the Ethernet network; and
utilize the received information to simulate a Fibre Channel arbitrated loop initialization process for the HBA module without sending or receiving any arbitrated loop primitives over the Ethernet network.

26. The networking device of claim 25, wherein the FCoE is further configured to locally simulate the arbitration and flow control behavior of a Fibre Channel arbitrated loop network during non-initialization network communications for the HBA module.

27. The networking device of claim 26, wherein
the HBA module is configured to send to the FCoE module one or more arbitrated loop primitives as well as a message to another device on the Ethernet network; and
the FCoE module is further configured to send the message to the other device without sending the primitives over the Ethernet network.

28. The networking device of claim 27, wherein the networking devices further comprises a memory and the FCoE module is further configured to:
receive a Fibre Channel and an Ethernet address for each of the one or more devices;
store the received addresses in the memory;
extract a Fibre Channel address from the message sent by the HBA module to the FCoE module, the Fibre Channel address being associated with the other device;
obtain an Ethernet address associated with the extracted Fibre Channel address from the stored received addresses; and
address the message to the obtained Ethernet address when sending the message.

29. The networking device of claim 26, wherein the FCoE module is further configured to:
receive a message over the Ethernet network from another device;
reformat the message to a format associated with a Fibre Channel loop network;
send one or more arbitrated loop primitives to the HBA module; and
send the reformatted message to the HBA module.

30. The networking device of claim 25, wherein the FCoE module is further configured to alert the HBA module of the one or more devices for which information was received while simulating the Fibre Channel arbitrated loop initialization process.

31. The networking device of claim 25, wherein the FCoE and HBA modules are configured to assign a Fibre Channel address for the networking device during the simulating of the Fibre Channel arbitrated loop initialization process for the HBA module, and the FCoE module is further configured to send the assigned Fibre Channel address to the server.

32. The networking device of claim 25, wherein the FCoE module is configured to communicate with the server over the Ethernet network by using the Ethernet protocol and the address resolution protocol (ARP) and without using the Internet Protocol (IP).

33. The networking device of claim 25, wherein the networking device is an HDA.

34. The networking device of claim 25, wherein the Ethernet network is a converged enhanced Ethernet (CEE) network.

35. A computing device comprising the networking device of claim 25.

36. A network comprising the networking device of claim 25.

37. A storage area network (SAN) comprising the networking device of claim 25.

38. A storage area network comprising:
an Ethernet network;
a server connected to the Ethernet network;
a plurality of devices connected to the Ethernet network, a first device of the plurality of devices comprising a networking device, the networking device comprising
an HBA module configured to communicate over a Fibre Channel Arbitrated loop network, and
an FCoE module connected to the HBA module and to the Ethernet network, the FCoE module being configured to
receive from the server connected to the Ethernet network information about one or more devices from the plurality of devices other than the first device connected to the Ethernet network; and
utilize the received information to simulate a Fibre Channel arbitrated loop initialization process for the HBA module without sending or receiving any arbitrated loop primitives over the Ethernet network.

39. The network of claim 38, wherein the FCoE module is further configured to alert the HBA module of the one or more devices for which information was received while simulating the Fibre Channel arbitrated loop initialization process.

* * * * *